(12) United States Patent
Poole et al.

(10) Patent No.: US 11,175,700 B1
(45) Date of Patent: Nov. 16, 2021

(54) ELECTRONIC DEVICES WITH ADJUSTABLE-APPEARANCE HOUSING STRUCTURES

(71) Applicant: Apple Inc., Cupertino, CA (US)

(72) Inventors: Joseph C. Poole, Boulder Creek, CA (US); Christopher D. Jones, Los Gatos, CA (US); Christopher D. Prest, San Francisco, CA (US); James R. Wilson, Saratoga, CA (US); Marta M. Giachino, Palo Alto, CA (US); Matthew S. Rogers, San Jose, CA (US)

(73) Assignee: Apple Inc., Cupertino ( * ) Notice: Subject to any disclaimer, the term of this patent is extended or adjusted under 35 U.S.C. 154(b) by 0 days.

(21) Appl. No.: 16/874,568

(22) Filed: May 14, 2020

(51) Int. Cl.
 *G06F 1/16* (2006.01)
 *H04M 1/02* (2006.01)
 *H05K 5/00* (2006.01)

(52) U.S. Cl.
 CPC .......... *G06F 1/1637* (2013.01); *G06F 1/1601* (2013.01); *G06F 1/1626* (2013.01); *G06F 1/1656* (2013.01); *G06F 1/1684* (2013.01); *H04M 1/0266* (2013.01); *H05K 5/0017* (2013.01)

(58) Field of Classification Search
 CPC combination set(s) only.
 See application file for complete search history.

(56) References Cited

U.S. PATENT DOCUMENTS

| | | | |
|---|---|---|---|
| 9,285,829 B2 | 3/2016 | Park | |
| 10,114,237 B2 * | 10/2018 | Wilson | G02F 1/0126 |
| 10,273,600 B1 * | 4/2019 | Bharadwaj | G02F 1/134309 |
| 10,289,166 B1 | 5/2019 | Chang et al. | |
| 10,353,123 B2 * | 7/2019 | Giachino | G06F 3/0443 |
| 10,620,716 B2 | 4/2020 | Thomas, III et al. | |
| 10,630,824 B2 * | 4/2020 | Wilson | G02F 1/13725 |
| 10,690,946 B2 * | 6/2020 | Wilson | G01L 1/24 |
| 10,928,566 B2 * | 2/2021 | Wilson | G02B 1/005 |
| 2007/0008684 A1 * | 1/2007 | Anderson | G06F 1/181 361/679.55 |
| 2007/0115621 A1 * | 5/2007 | Guillen | G06F 1/1601 361/679.26 |
| 2008/0019089 A1 * | 1/2008 | Chi | G06F 1/1637 361/679.26 |
| 2008/0055828 A1 * | 3/2008 | Yang | G06F 1/1637 361/679.09 |

(Continued)

*Primary Examiner* — Lisa Lea-Edmonds
(74) *Attorney, Agent, or Firm* — Treyz Law Group, P.C.; G. Victor Treyz

(57) ABSTRACT

An electronic device may have a display for displaying images. The display may be coupled to a housing on a front face of the device. The housing may have a transparent portion on an opposing rear face of the device. The electronic device may have structures with an adjustable appearance. The adjustable-appearance structures may include a mask with openings or other mask elements and a corresponding overlapped patterned layer containing an array of visual elements. The visual elements may have different appearances, so that movement of the mask relative to the patterned layer changes the appearance of the adjustable-appearance structures. The state of the adjustable-appearance structure may be changed during use of the device by a user or may be adjusted then fixed during manufacturing.

20 Claims, 17 Drawing Sheets

(56) References Cited

U.S. PATENT DOCUMENTS

| | | | | |
|---|---|---|---|---|
| 2013/0321237 A1* | 12/2013 | Woodhull | ............... | G03F 1/38 |
| | | | | 343/872 |
| 2014/0076600 A1* | 3/2014 | Browning | .............. | C25D 11/02 |
| | | | | 174/50 |
| 2014/0247404 A1 | 9/2014 | Jarvis et al. | | |
| 2017/0059890 A1* | 3/2017 | Wilson | ..................... | G01L 1/24 |
| 2017/0213665 A1 | 7/2017 | Weber et al. | | |

\* cited by examiner

ELECTRONIC DEVICES WITH ADJUSTABLE-APPEARANCE HOUSING STRUCTURES

FIELD

This relates generally to electronic devices, and, more particularly, to housings for electronic devices.

BACKGROUND

Electronic devices have housings in which displays and other components are mounted. Device housings are sometimes provided in different finishes.

SUMMARY

An electronic device may have a display for displaying images. The display may be coupled to a housing on a front face of the device. Other portions of the housing may be transparent. For example, the housing may have a transparent portion on a rear face of the device.

The electronic device may have structures with an adjustable appearance. These structures may be viewable through the transparent portion of the housing, thereby allowing the appearance of the device to be controlled.

The adjustable-appearance structures may include a mask with openings or other mask elements. For example, the mask may include an opaque thin-film layer with an array of circular openings or openings of other shapes. The adjustable-appearance structure may also include a patterned layer containing an array of visual elements. Different sets of visual elements may be viewed through the mask depending on the relative position of the mask to the visual elements in the patterned layer.

The visual elements may include elements with different appearances. Movement of the mask relative to the patterned layer may change which of the visual elements are viewable and thereby change the overall appearance of the adjustable-appearance structures and the housing of the electronic device.

The state of the adjustable-appearance structures may be changed during use of the device by a user or may be established during manufacturing. For example, adjustable-appearance structures may be adjusted and then fixed in place in a factory, thereby ensuring that the structures maintain a desired appearance during subsequent use by a user.

DETAILED DESCRIPTION

An electronic device may have a housing in which a display and other components are mounted. The housing may have transparent portions such as transparent rear wall, side wall and/or front wall structures. These transparent housing structures may overlap structures with an adjustable appearance, thereby providing one or more areas of the housing of the electronic device with an adjustable appearance.

In an illustrative configuration, the adjustable-appearance structures may include a first layer such as an outer mask layer with openings or other masking features and a second layer such as an inner patterned layer having patterned visual features. The relative position between the first and second layers can be adjusted to change the outward appearance of the adjustable-appearance structures.

If desired, adjustments made to the adjustable-appearance structures may be permanent or semi-permanent. For example, the relative position between the outer mask layer and inner patterned layer can be adjusted during manufacturing and then fixed in place. The adjustable-appearance structures may also be adjusted manually (e.g., using an adjustable screw or other positioner that remains in a static configuration once adjusted). With arrangements such as these, no power need be consumed by the adjustable-appearance structures during device operation. In some configurations, electrically controlled actuators may be used to move the layers relative to each other. This allows the adjustable-appearance structures to provide visual notifications or other output to a user dynamically. Configurations in which the appearance of the adjustable-appearance structures is static during normal use of a device by a user are sometimes described herein as an example.

Figure 1:
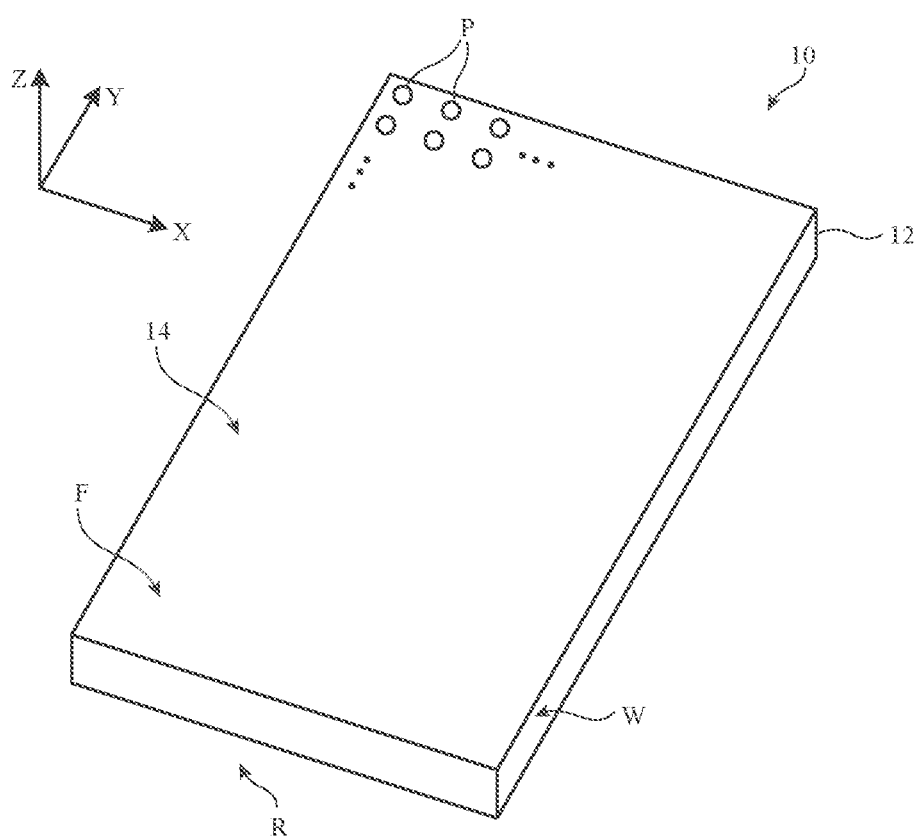
FIG. 1 is a perspective view of an illustrative electronic device in accordance with an embodiment.

A perspective view of an illustrative electronic device of the type that may include an adjustable-appearance structure is shown in FIG. 1. Device 10 may be a laptop computer, a computer monitor containing an embedded computer, a tablet computer, a desktop computer, a cellular telephone, a media player, or other handheld or portable electronic device, a smaller device such as a wristwatch device, a wristband device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices. In the illustrative configuration of FIG. 1, device 10 is a portable electronic device such as a cellular telephone or tablet computer. This configuration may sometimes be described herein as an example.

As shown in FIG. 1, device 10 may have a housing such as housing 12. Housing 12 may be formed from materials such as polymer, glass, metal, crystalline materials such as sapphire, ceramic, fabric, foam, wood, other materials, and/or combinations of these materials. Device 10 may have any suitable shape. In the example of FIG. 1, device 10 has front face F with a rectangular outline, opposing rear face R. and sidewall portions (sidewalls) W. Portions W may be formed as extensions of the housing structures on front face F, rear face R. and/or may be formed using one or more separate sidewall members (as examples). Sidewall structures may be planar (e.g., to form vertical sidewalls extending between front F and rear R) and/or may have curved cross-sectional profiles. Input-output devices such as one or more buttons may be mounted on housing 12 (e.g., on sidewall portions W).

Device 10 may have one or more displays such as display 14. In the example of FIG. 1, display 14 covers front face F. Display 14 may also be mounted on other portions of device 10. For example, one or more displays such as display 14 may cover all of front face F, part of front face F, some or all of rear face R. and/or some or all of sidewalls W.

Housing 12 may include outwardly facing structures that form external device surfaces and/or may include frame structures, supporting plates, and/or other internal support structures. In some configurations, housing 12 may include flexible or rigid transparent members (e.g., transparent housing walls). Transparent housing members may overlap adjustable-appearance structures. For example, transparent portions of housing 12 on some or all of front face F, on some or all of sidewalls W, and/or on some or all of rear face R may overlap adjustable-appearance structures, thereby providing one or more portions of housing 12 and device 10 with an adjustable appearance. Device 10 may also have transparent housing members that cover displays. Such transparent structures, which may sometimes be referred to as display cover structures or a display cover layer, may overlap at least some of display 14 and may serve to protect display 14. If desired, transparent thin-film structures may serve as protective display layers (e.g., scratch-resistance layers, oleophobic anti-smudge coating layers, etc.).

Display 14 may have a planar shape, a shape with a curved cross-sectional profile, or other suitable shape. In the example of FIG. 1, front face F has a planar shape and lies in the X-Y plane. Display 14 may have a rectangular footprint (outline when viewed from above) or other suitable footprint. Device 10 may be elongated along a longitudinal axis that extends parallel to the Y axis of FIG. 1 or along other directions (e.g., parallel to the X axis of FIG. 1). The thickness of device 10 in dimension Z may be less than the width of device 10 in dimension X and less than the length of device 10 in dimension Y (as an example).

Display 14 may have an array of pixels P. Pixels P form an active display area that displays images for a user during operation of device 10. If desired, an array of touch sensor electrodes (e.g., capacitive touch sensor electrodes) may overlap display 14 and pixels P (e.g., display 14 may be a touch screen display). Pixels P may be organic light-emitting diode pixels, pixels formed from crystalline semiconductor light-emitting diode dies, liquid crystal display pixels, electrophoretic display pixels, and/or pixels associated with other types of displays.

Figure 2:
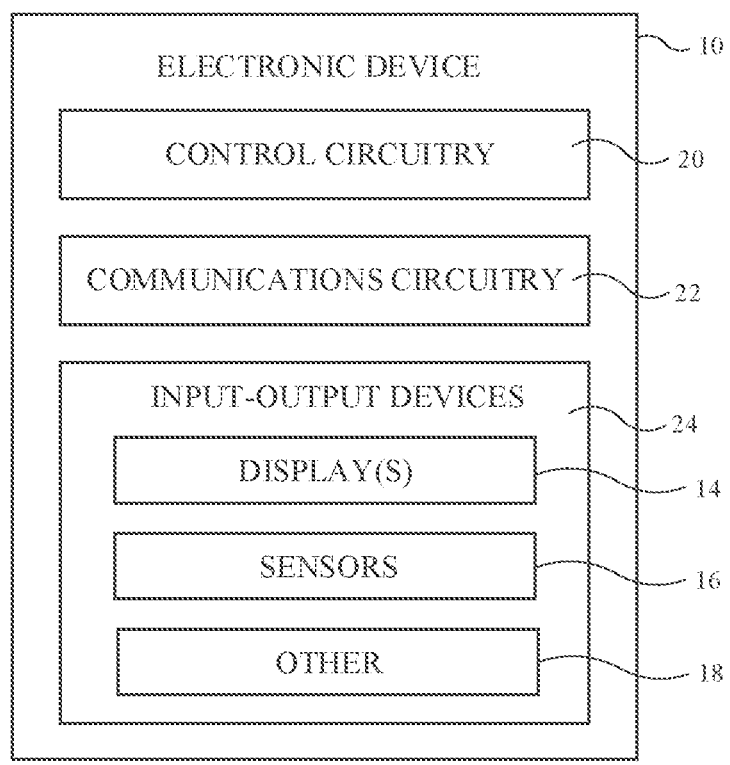
FIG. 2 is a schematic diagram of an illustrative electronic device in accordance with an embodiment.

A schematic diagram of an illustrative electronic device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 5 GHz and 10 GHz, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras such as cameras on front face F and/or rear face R of device 10), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 24 may include optical components such as camera(s), depth sensors (e.g., structured light sensors or other sensors that gather three-dimensional image data), optical proximity sensors, ambient light sensors (e.g., color ambient light sensors), optical time-of-flight sensors (cameras) and other sensors 16 that are sensitive to visible and/or infrared light and that may emit visible and/or infrared light (e.g., devices 24 may contain optical sensors that emit and/or detect light). For example, a visible-light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see. e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
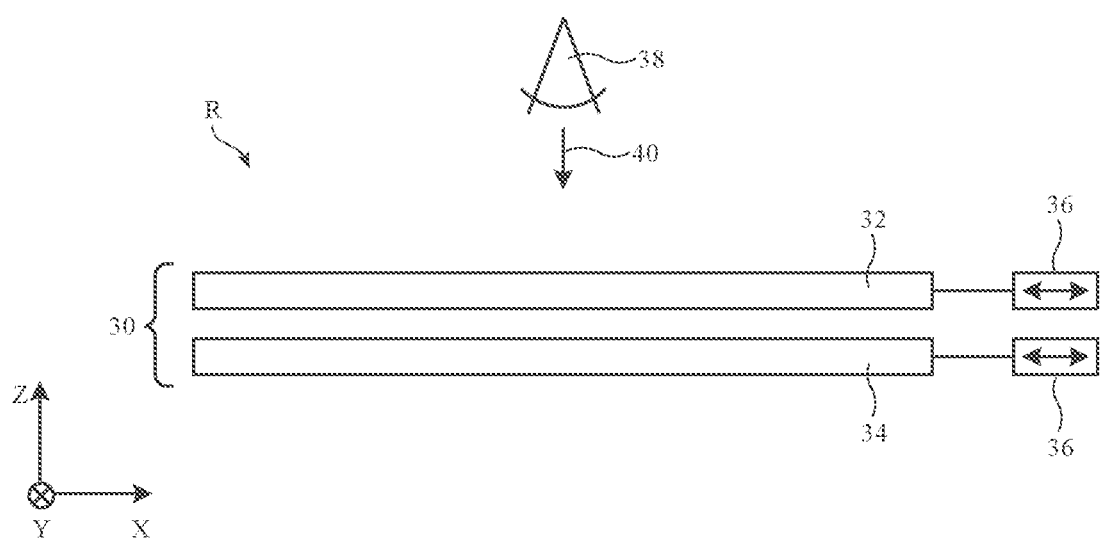
FIG. 3 is cross-sectional side view of illustrative adjustable-appearance structures for changing the appearance of a housing in an electronic device in accordance with an embodiment.

Illustrative adjustable-appearance structures are shown in FIG. 3. Adjustable-appearance structures 30 may form one or more adjustable-appearance layers located on front face F, sidewalls W, rear face R (as shown in the example of FIG. 3), and/or other surface(s) of device 10. Structures 30 may be located under transparent housing walls and/or may include transparent layers that are attached to housing walls or form housing walls or other structural portions of device 10 (e.g., structures 30 may sometimes be referred to as housing structures, adjustable-appearance housing structures, etc.).

As shown in FIG. 3, adjustable-appearance structures 30 may include a mask such as mask 32 and an underlying structure with markings such as patterned layer 34. Layer 34 may be, for example, a layer with patterned visual elements such as circles, lines, rectangles, and/or visual elements with outlines that have straight edges, curved edges, and/or a combination of one or more straight edges and one or more curved edges. The visual pattern created by the visual features in patterned layer 34 may be a regular visual pattern (e.g., an array of regularly spaced visual features) and/or may be a partly or completely random pattern with irregular visual features. Configurations in which the pattern of layer 34 includes an orderly array of visual elements are sometimes described herein as an example.

Mask 32 may have a regular or irregular pattern of masking features. As an example, mask 32 may be an opaque layer with an array of openings. A user such as viewer 38 who is viewing structures 30 in direction 40 may view visual elements in layer 34 through the openings. The relative position of layer 32 with respect to layer 34 may be adjusted using one or more positioners such as positioners 36. For example, the lateral position of mask 32 relative to layer 34 may be shifted using one or more positioners. In a first position, the openings of mask 32 may be aligned with a first set of visual elements on layer 36 (e.g., red features), causing structures 30 to have a first appearance (e.g., a red appearance) as structures 30 are viewed in direction 40 by viewer 38. In a second position, the openings of mask 32 may be aligned with a second set of visual elements on layer 36 (e.g., blue features), causing structures 30 to have a second appearance (e.g., a blue appearance) as structures 30 are viewed in direction 40 by viewer 38. The interplay between the optical characteristics of mask 32 and the appearance of the patterned features in layer 34 therefore allows the appearance of structures 30 to be adjusted when the positions of mask 32 and/or 34 are changed with respect to each other.

Positioners 36 may be motors or other electromagnetic actuators, piezoelectric actuators, or other electrically adjustable positioners (e.g., positioners controlled dynamically in response to control signals from control circuitry 20) or may be screws or other manually adjustable positioners (e.g., one or more screws that can move layer 32 and/or layer 34 laterally in dimension X and/or dimension Y so that the lateral position of layer 32 relative to layer 34 is set as desired).

If desired, layers 32 and 34 may be positioned in a desired relationship (e.g. a desired lateral alignment) in a factory during manufacturing. Fasteners (e.g., screws, etc.), adhesive (e.g., adhesive between layers 32 and/or 34 and/or other adhesive), welds, interlocking engagement structures (e.g., clips, etc.), and/or other structures may be used to position layers 32 and/or 34 in desired locations with respect to housing 14 and/or each other and may be used in holding layers 32 and 34 in these locations (e.g., in a static configuration that does not alter during normal use of device 10). With arrangements such as these, the relative positions of layers 32 and 34 are never changed or are only infrequently manually adjusted (e.g., by turning a screw) after device 10 has been manufactured.

In general, any suitable positioning structures such as electrically adjustable positioners for use during operation of device 10, manually adjustable positioners such as screws, and/or factory positioning equipment may be used in temporarily and/or permanently positioning layers 32 and 34 and/or any suitable mounting structures such as adhesive, screws or other fasteners, clips or other engagement structures, press-fit connections, welds, etc. may be used in maintaining layers 32 and 34 in desired positions.

Figure 4:
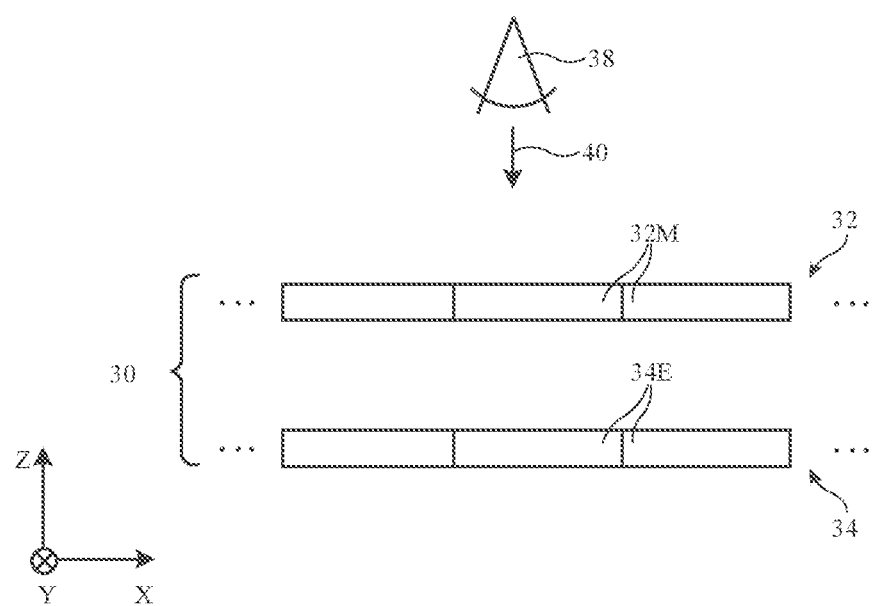
FIG. 4 is a cross-sectional side view of illustrative adjustable-appearance structures showing how a mask layer and patterned layer may overlap in accordance with an embodiment.

FIG. 4 is a cross-sectional side view of adjustable-appearance structure 30 showing how mask 32 may have masking features such as mask elements 32M and showing how patterned layer 34 may have visual features such as visual elements 34E). Elements 32M may have the same size and shape and/or may include one or more different types of elements 32M each with a different size, shape, and/or optical characteristic. Elements 34E may have the same size and shape and/or may include one or more different types of elements 34E each with a different size, shape, and/or optical characteristic. The lateral dimensions (dimensions along axes X and Y of FIG. 4) of elements 32M and 34E may, if desired, be sufficiently small that individual elements are invisible to the naked (unaided) eye. For example, elements 32M and/or 34E may have lateral dimensions that are less than 60 microns, less than 50 microns, less than 30 microns, less than 15 microns, 20-60 microns, 30-60 microns, at least 10 microns, or other suitable value. Elements 32M and/or 34E may be circular, rectangular, and/or may have other suitable outlines (footprints when viewed in direction 40). When the lateral dimensions of the elements in mask 32 are too small to view with the unaided eye, structures 30 will have a uniform appearance (e.g., individual dots or other features associated with individual mask elements will not be noticeable). The size and shape of elements 32M and 34E may differ from each other. For example, elements 34E may be larger or smaller or may have different shapes than elements 32M. Some of elements 32M and/or 34E may merge to form a grid or other contiguous matrix-shaped element(s). Other elements 32M and/or other elements 34E may form islands.

Elements 32M and 34E may be formed from polymer (e.g., clear polymer, colored transparent polymer such as polymer that is blue, red, green, or has other non-neutral color or transparent polymer that has a neutral gray tone), may be formed from reflective materials such as metal (e.g., one or more metal layers that reflect light and/or impart a desired color to light), may be formed from opaque materials or other materials that absorb light (e.g., metal, ink formed from polymer in which dark pigment and/or dye such as black colorant has been added or other opaque polymer such as white opaque polymer, opaque ceramic, opaque crystalline material, etc.), may be formed from materials with low haze (e.g., haze less than 5% or other suitable low haze value), may be formed from materials with more haze (e.g., a haze value of at least 5%, at least 30%, at least 70%, less than 95%, etc.), and/or other materials (e.g., hazy materials such as materials with texture, materials with light-scattering particles embedded in a binder such as aluminum oxide particles, other metal oxide particles, or other inorganic dielectric particles embedded in polymer, hazy material with vacuum-filled, liquid-filled, or gas-filled cavities, etc.), and/or may be formed from other materials with desired optical properties (e.g., one or more desired values of haze, light reflection, light absorption, light transmission, color, etc.).

In a first illustrative configuration, mask 32 contains a global opaque layer with an array of openings. For example, a layer of ink (black ink, white ink, gray ink, or non-neutrally colored ink) may have rows and columns of transparent elements 32M formed from openings in the layer of ink (e.g., openings that are optionally filled with clear polymer or other filler material). This mask may overlap visual elements 34E such as dots or other visual elements with desired appearances (e.g., dots, lines, or other elements of various colors, reflectivity values, light absorption properties, sizes and/or shapes). Visual elements 34E may, as an example, be formed in an array pattern that is the same as or similar to the array pattern for the transparent elements in mask 32 (e.g., an array with the same pitch as the array of elements in mask 32). This type of arrangement allows the appearance of structures 30 to be adjusted by shifting the lateral position of mask 32 relative to layer 34 so that the openings or other transparent elements 32M of mask 32 selectively reveal desired sets of elements 34E. In some arrangements, interference effects such as Moiré patterns may be produced. In other arrangements, text, images, icons, geometric patterns, and/or other features may be produced by structures 30 in one or more of the adjustable configurations associated with structures 30. Solid colors, color gradients, and/or other solid and/or patterned appearance effects may also be produced.

Mask 32 may abut layer 34 or may be separated from layer 34 by a gap filled with fluid (e.g., air or other gas or oil or other liquid), polymer, and/or other material. The vertical separation between elements 32M and elements 34E along the Z axis may be, for example, at least 0.1 microns, at least 1 micron, at least 10 microns, at least 100 microns, at least 1000 microns, less than 2000 microns, less than 500 microns, less than 150 microns, less than 20 microns, or other suitable value.

Figure 5:
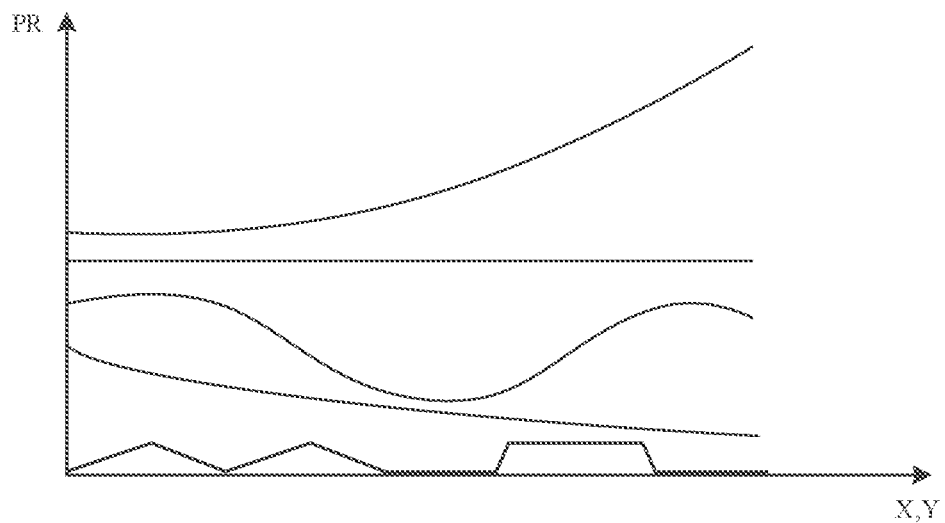
FIG. 5 is a graph showing how structures in a mask and/or a patterned layer may vary as a function of lateral position within the mask or patterned layer in accordance with an embodiment.

The attributes of elements 32M and/or 34E may be constant across the surface of structures 30 and/or may vary as a function of lateral position (distance along the X and/or Y axes) and/or as a function of vertical position (along axis Z). FIG. 5 is a graph showing how one or more physical and/or optical properties PR of mask 32 and/or patterned layer 34 may vary as a function of dimensions X and Y. Properties PR may include spectral reflectance, transmission, and/or absorption for light, may include element size, shape, contiguousness, spacing (e.g., pitch associated with element center-to-center spacings), may include optical properties such as haze, color, etc., and/or other properties. As shown by the illustrative curves of the graph of FIG. 5, these properties of elements 32M and/or 34E may be varied (e.g., these properties may increase and/or decrease as a function of X and/or Y), may remain constant as a function of X and/or Y, may sometimes not be present or may sometimes have a zero value (e.g., in scenarios in which light transmission, absorption, or reflectivity is sometimes zero as a function of X and/or Y), may vary smoothly and/or discontinuously, etc.).

Figure 6:
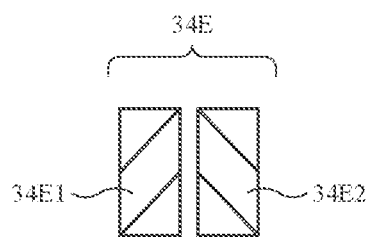
FIG. 6 is a top view of a portion of an illustrative patterned layer in accordance with an embodiment.
Figure 7:
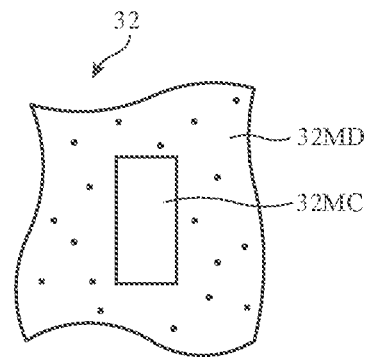
FIG. 7 is a top view of a portion of an illustrative mask that may overlap the patterned layer of FIG. 6 in various alignments in accordance with an embodiment.
Figure 8:
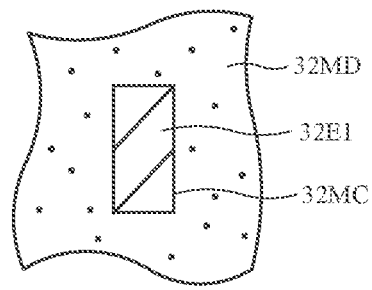
FIG. 8 is a top view of the mask of FIG. 7 in a first illustrative configuration in which an opening in the mask overlaps a first area of the patterned layer of FIG. 6 in accordance with an embodiment.
Figure 9:
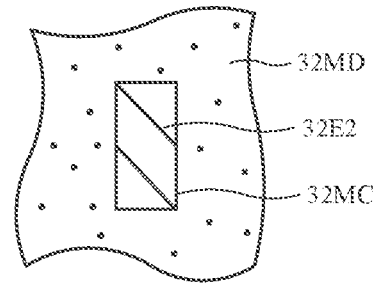
FIG. 9 is a top view of the mask of FIG. 7 in a second illustrative configuration in which the opening in the mask overlaps a second area of the patterned layer of FIG. 6 in accordance with an embodiment.
Figure 10:
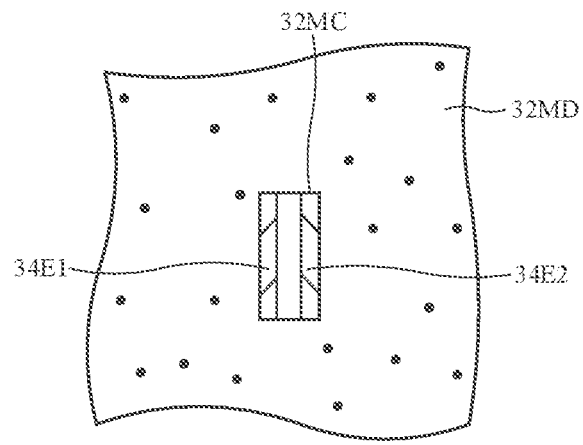
FIG. 10 is a top view of the mask of FIG. 7 in a third illustrative configuration in which the opening in the mask overlaps a portion of the first area and a portion of the second area of the patterned layer of FIG. 6 in accordance with an embodiment.

FIGS. 6, 7, 8, 9, and 10 illustrate how the position of mask 32 relative to layer 34 may be used to vary the appearance of structures 30. FIG. 6 is a top view of a portion of patterned layer 34. In the example of FIG. 6, layer 34 has an array (multiple rows and multiple columns) of two types of elements 34E: first elements 34E1 and second elements 34E2. The optical properties of elements 34E1 and 34E2 differ. For example, elements 34E1 and 34E2 may have different colors, different reflectivities, different surface finishes (matte versus glossy), etc. As an example, elements 34E1 may be red and elements 34E2 may be yellow. Mask 32 may have an array of openings such as rectangular opening 32MC of FIG. 7 formed within a global opaque layer such as layer 32MD (e.g., a blanket polymer film forming a white mask layer). The array of openings 32MC may be configured to have the same layout as the array of elements 34E1 and the same layout as the array of elements 34E2 (e.g., the same number of rows and columns, the same element size and pitch, etc.). As shown in FIG. 8, in a first position for mask 32 relative to layer 34, openings 32MC may align with elements 34E1, so that structures 30 have a red appearance. In a second position for mask 32 relative to layer 34, openings 32MC align with elements 34E2 as shown in FIG. 9, so that structures 30 have a yellow appearance. Partial overlap scenarios are also possible. For example, mask 32 may be positioned relative to layer 34 so that openings 32MC partially overlap red elements 34E1 and partially overlap yellow elements 34E2 as shown in FIG. 10. In this configuration, the outward appearance of structures 30 are influenced both by the presence of parts of element 34E1 in openings 32MC and by the presence of parts of elements 34E2 in openings 32MC. For example, structures 30 may appear to be orange (a blend of red and yellow).

Figure 11:
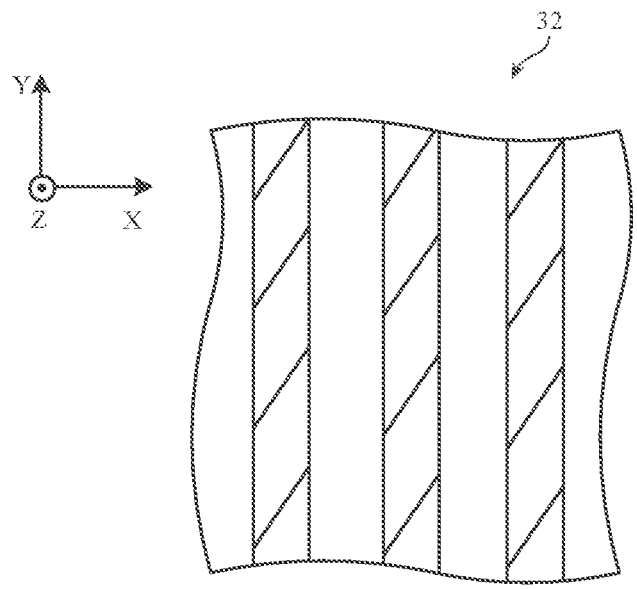
FIG. 11 is a top view of an illustrative mask with elongated masking elements in accordance with an embodiment.
Figure 12:
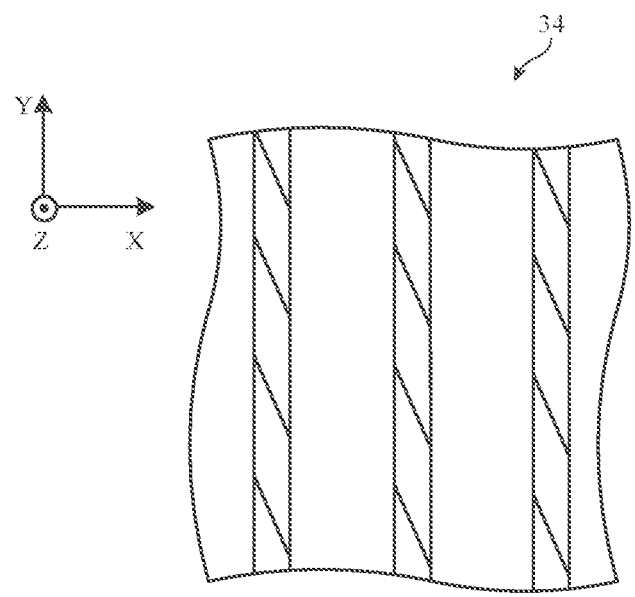
FIG. 12 is a top view of an illustrative patterned layer with elongated visual elements in accordance with an embodiment.

Mask 32 and patterned layer 34 may have elements of any suitable shape. In the example of FIG. 11, mask 32 has mask elements with elongated shapes. Mask 32 may, for example, have opaque elements, clear elements, and/or other elements that have elongated strip shapes such as the stripes of FIG. 11. Patterned layer 34 may contain colored elements, reflective elements, dark elements, and/or other visual elements with elongated strip shapes such as the stripes of FIG. 12. As with other configurations for adjustable-appearance structures 30, the positions of mask 32 and layer 34 may be adjusted relative to each other by laterally shifting mask 32 and/or layer 34 and/or by rotating mask 32 and/or layer 34 by a non-zero angle.

Figure 13:
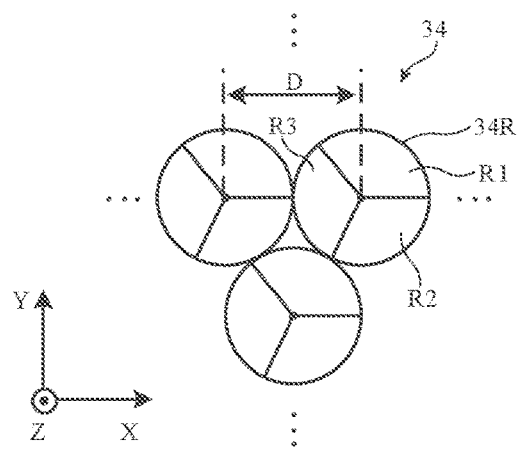
FIG. 13 is a top view of an illustrative patterned layer with multi-section circular visual features in accordance with an embodiment.
Figure 14:
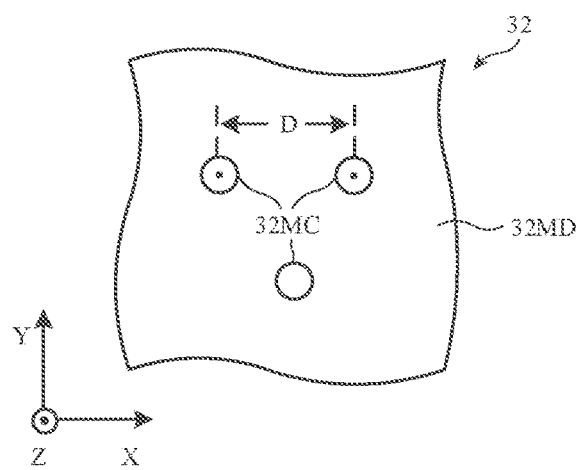
FIG. 14 is a top view of an illustrative mask with circular mask elements that may overlap a patterned layer such as the patterned layer of FIG. 13 in accordance with an embodiment.

Another illustrative configuration for adjustable-appearance structures 30 is shown in the example of FIGS. 13, 14, 15, and 16. FIG. 13 is a top view of an illustrative patterned layer. Layer 34 of FIG. 13 has an array of circular regions 34R characterized by a center-to-center spacing D. In this example, each region 34R has three wedge-shaped areas such as sections R1, R2, and R3 with different respective optical characteristics. Sections R1, R2, and/or R3 may, for example, each have a different color (e.g., the primary subtractive colors of magenta, cyan, and yellow, respectively and/or other colors) or may otherwise have different visual appearances. Mask 32 may have openings 32MC with a layout that matches the array of visual elements of layer 34 (e.g., openings 32MC may be arranged in an array with the same center-to-center spacing D as regions 34R of FIG. 13).

Figure 15:
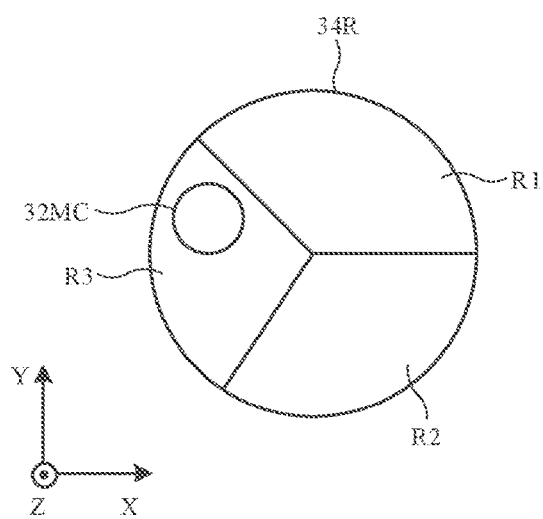
FIGS. 15 and 16 are top views of the mask and patterned layers of FIGS. 13 and 14 in accordance with an embodiment.
Figure 16:
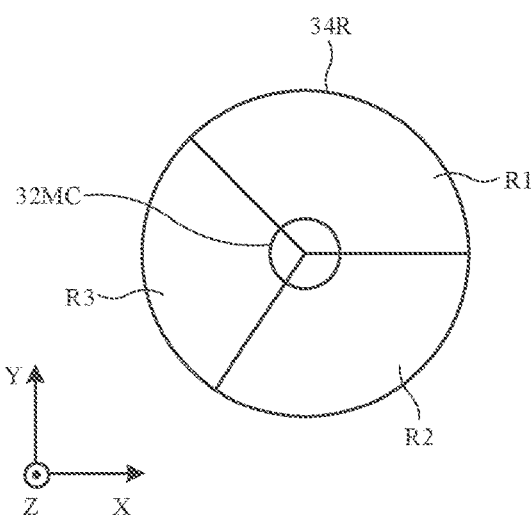

The diameters of openings 32MC may be smaller than sections R1, R2, and R3. As shown in FIG. 15, this allows mask openings 32MC to be aligned with a desired one of the types of visual elements in layer 34 (e.g., openings 32MC may each overlap a respective section R3 without overlapping sections R1 and R2, so that structures 30 appear yellow in this example). If desired, blended colors may be created (e.g., by positioning mask 32 and layer 34 so that openings 32MC overlap desired amounts of sections R1, R2, and R3, respectively, as shown in FIG. 16). This allows any desired blend of the colors of the areas associated with sections R1, R2, and R3 of regions 34R to be produced, making an essentially unlimited number of different colors available for structures 30. Color selections may be made on user preference, based on factory settings, etc.

If desired, one or more of the positions of mask 32 relative to layer 34 may be associated with a recognizable pattern (e.g., a potentially complex image, rather than a solid color or simple repeating geometric pattern). The recognizable pattern may include, for example, a company logo, text (e.g., one or more alphanumeric characters), a photographic image, a symbol (e.g., a battery charging indicator, a wireless signal strength indicator, a button label, and/or other suitable symbolic content), or other patterned item.

Figure 17:
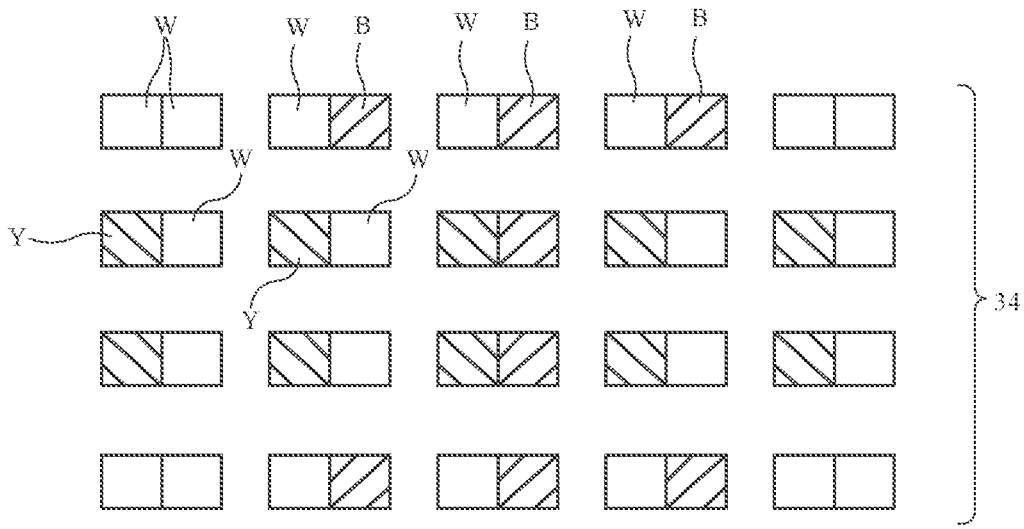
FIG. 17 is a top view of an illustrative patterned layer in accordance with an embodiment.
Figure 18:
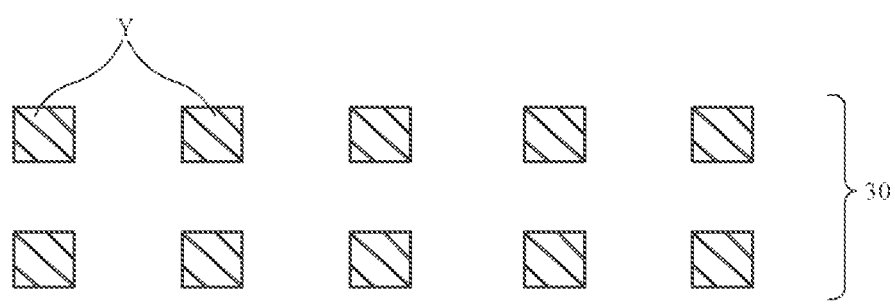
FIGS. 18 and 19 show the appearance of the illustrative patterned layer of FIG. 17 as an illustrative overlapping mask with an array of masking features is shifted between first and second positions with respect to the patterned layer in accordance with an embodiment.
Figure 19:
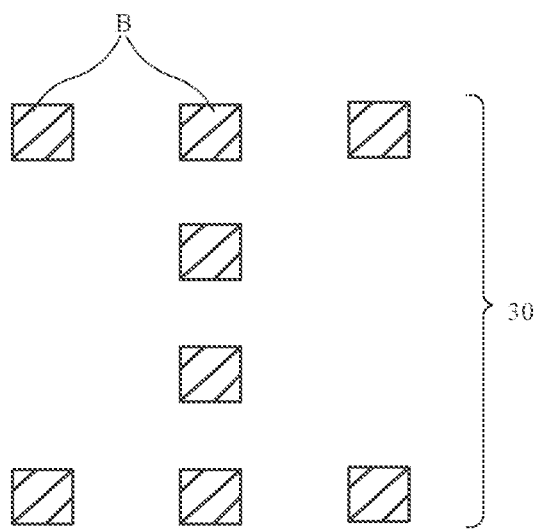

Consider, as an example, the illustrative arrangement of FIGS. 17, 18, and 19. FIG. 17 is a top view of an illustrative patterned layer 34. Layer 34 has an array of visual element pairs. As shown in FIG. 17, layer 34 may contain white elements W, blue elements B, and yellow elements Y. Mask 32 may be a solid white layer with an array of openings configured to reveal either the left-hand or right-hand side of each adjacent pair of elements. In the example of FIG. 17, mask 32 has been positioned to reveal the left-hand elements, which are yellow and have the shape of a horizontal stripe. In the example of FIG. 18, mask 32 has been shifted to the right to reveal the right-hand elements, which are blue and have the shape of the letter 1. Any suitable number of differently patterned visual items may be selected in this way (e.g., at least one, at least two, at least three, at least four, fewer than five, etc.). Each visual item that is revealed may include a desired combination of text, graphics (e.g., photographic images, graphical design elements, abstract patterns, line art, cartoons, icons, alert messages, abstract patterns, solid colors, color gradients, images such as user-uploaded images that are printed onto layer 34 during manufacturing, etc.). The example of FIGS. 17, 18, and 19 is illustrative.

Mask 32 and/or layer 34 may be formed from one or more substrate layers (e.g., layers of polymer, glass, and/or other materials) and/or may have structures formed from patterned thin-film layers, selectively machined structures, and/or areas processed using other techniques (e.g., chemically etched areas, laser-processed areas, mechanically machined areas, ink-jet printed areas, screen printed areas, etc.). Thin-films on the substrate layers may include metal films, dielectric films formed from organic and/or inorganic dielectric materials, polymer layers, and/or other thin-film layers.

Figure 20:
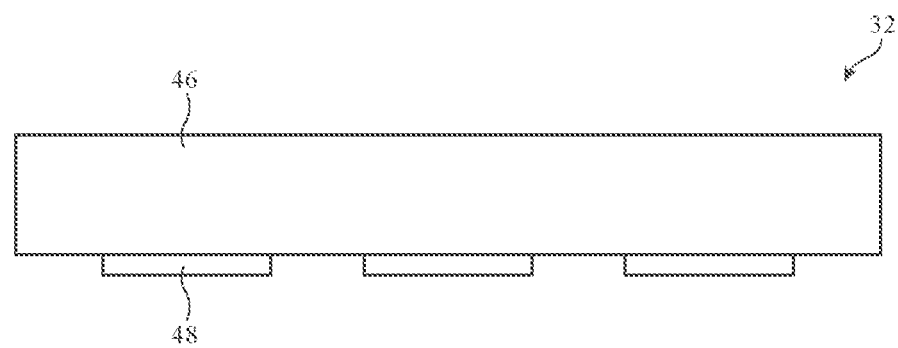
FIGS. 20 and 21 are cross-sectional side views of illustrative masks in accordance with embodiments.

Consider, as an example, the cross-sectional side view of mask 32 of FIG. 20. In this example, mask 32 has a substrate such as transparent substrate 46 (e.g., a layer of polymer, glass, crystalline material such as sapphire, a combination of two or more of these materials and/or other materials, etc.). Patterned thin-film layer 48 may be formed from metal, ink, and/or other material patterned using lift-off, printing, etching, physical vapor deposition, laser processing, and/or other processing techniques. Layer 48 may be patterned to form, mask elements with various different optical and/or physical properties. Layer 48 may face inwardly toward patterned layer 34 or may face outwardly toward viewer 38 and the external environment surrounding device 10.

Figure 21:
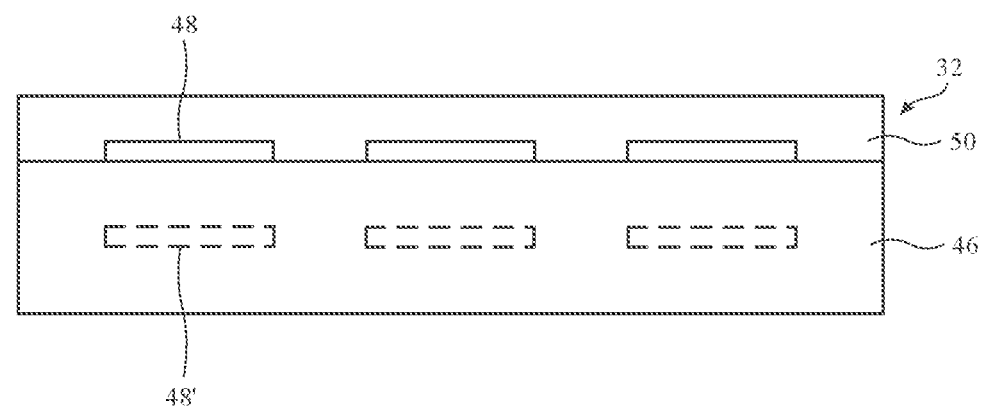

As shown in FIG. 21, layer 48 of mask 32 may be covered with a layer such a layer 50 (e.g., a layer of glass, polymer, crystalline material such as sapphire, other materials, and/or combinations of any of these materials, etc.). Layer 50 and/or additional layers attached to layer 50 and/or layer 46 may help protect and support the structures of mask 32. If desired, the patterned structures of mask 32 may be embedded in substrate 46 (e.g., at locations such as location 48' of FIG. 21). Substrate 46 of FIGS. 20 and 21 may be a structural housing layer, a rigid or flexible polymer layer mounted to the inside of a structural housing layer formed from glass, polymer, crystalline material, and/or other materials, etc., and/or other suitable layer forming part of housing 12 and/or coupled to and/or mounted adjacent to housing 12. As such, layers in adjustable-appearance structures 30 such as substrate 46 may sometimes be referred to as housing layers or housing structures.

Figure 22:
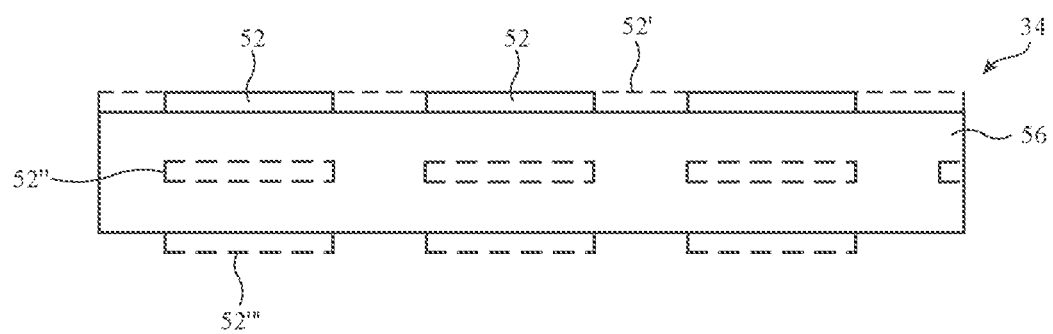
FIG. 22 is a cross-sectional side view of an illustrative layer of patterned visual features in accordance with an embodiment.

As shown in FIG. 22, patterned layer 34 may have a patterned thin-film layer or other patterned structures such as layer 52. Layer 52 may have openings 52' and/or openings 52' may be filled with polymer or other material with different properties than remaining portions of layer 52. Layer 52 may be supported on the inner and/or outer surface of one or more substrate layers such as illustrative substrate layer 56. Layer 56 may be formed from polymer, glass, ceramic, crystal material such as sapphire, metal, other materials, and/or a combination of two or more of these materials. The patterned visual elements of layer 34 (e.g., the structures of layer 52) may, if desired, be embedded within substrate layer 56 (see, e.g., illustrative layer 52") and/or layer 34 may include patterned structures such as structures 52''' on the inwardly facing surface of layer 56 (as examples). Substrate 56 may be coupled to or mounted adjacent to housing structures in device 10 and/or may serve as a structural housing layer.

Figure 23:
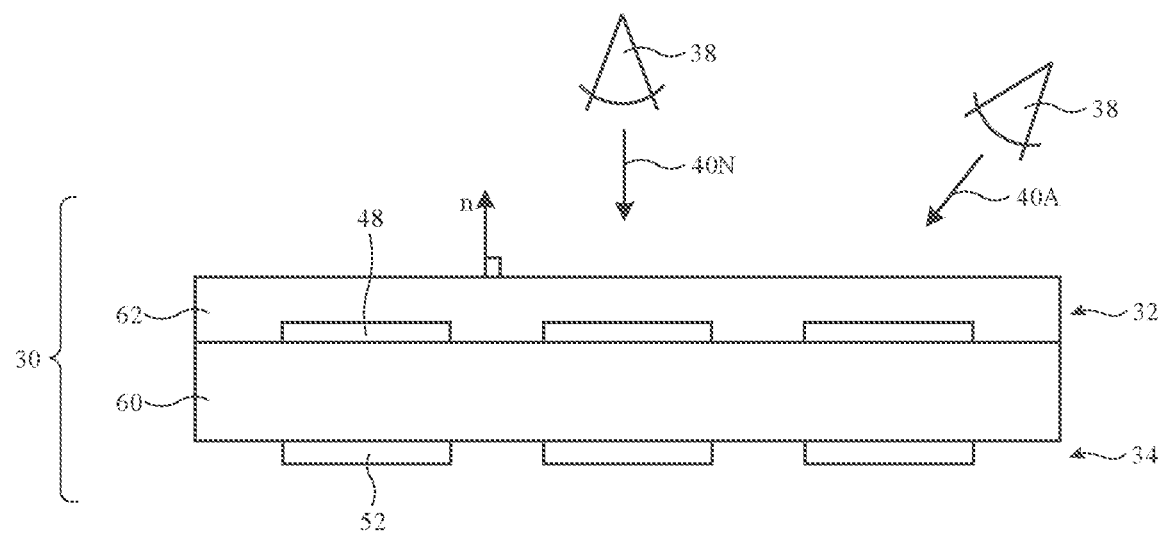
FIG. 23 is a cross-sectional side view of illustrative masking layer and patterned layer structures in accordance with an embodiment.

If desired, mask 32 and patterned layer 34 may be formed using a shared substrate and/or one or more other shared layers (e.g., structural housing layers, layers coupled to or mounted adjacent to housing 12, etc.). In the example of FIG. 23, mask 32 includes patterned mask elements formed from patterned thin-film structures such as layer 48 on the outwardly facing surface of substrate layer 60 (e.g., a clear polymer layer, glass layer, etc.) and patterned layer 34 includes visual elements formed from patterned thin-film structures such as layer 52 on the opposing inwardly facing surface of substrate layer 60. Optional transparent protective layer 62 (e.g., a transparent housing wall or other layer of glass, polymer, etc.), may overlap and protect the structures of mask 32 and layer 34.

If desired, structures 30 of FIG. 23 and/or other adjustable-appearance structures may be configured so that the appearance of structures 30 varies as a function of angular orientation (e.g., the direction in which viewer 38 views structures 30). As shown in the example of FIG. 23, viewer 38 may view structures 30 in a first direction such as direction 40N that is parallel to surface normal n of structures 30 or may view structures 30 in a second direction such as direction 40A that is oriented at 45° or other non-zero angle with respect to surface normal n. When viewing structure 30 in the first direction, a different set of the visual elements of layer 34 is viewable through mask 32 than when viewing structure 30 in the second direction. As a result, the appearance of structures 30 may change (e.g., changes may be observed in the color, reflectivity, haze, presence/absence of identifiable visual patterns such as logos, text, graphics, etc.). In configurations in which the patterned elements of structures 30 are close to each other along dimension Z (e.g., less than 50 microns, less than 25 microns, less than 15 microns, less than 7 microns, less than 4 microns, etc.), structures 30 may exhibit unnoticeable amounts of change in visual appearance as a function of changes in viewing angle (e.g. structures 30 may appear identical to viewer 38 regardless of whether viewer 38 views structures 30 in direction 40N or direction 40A). If desired, structures 30 may be configured so that some areas exhibit angularly dependent visual changes, whereas other areas to not exhibit such changes.

Figure 24:
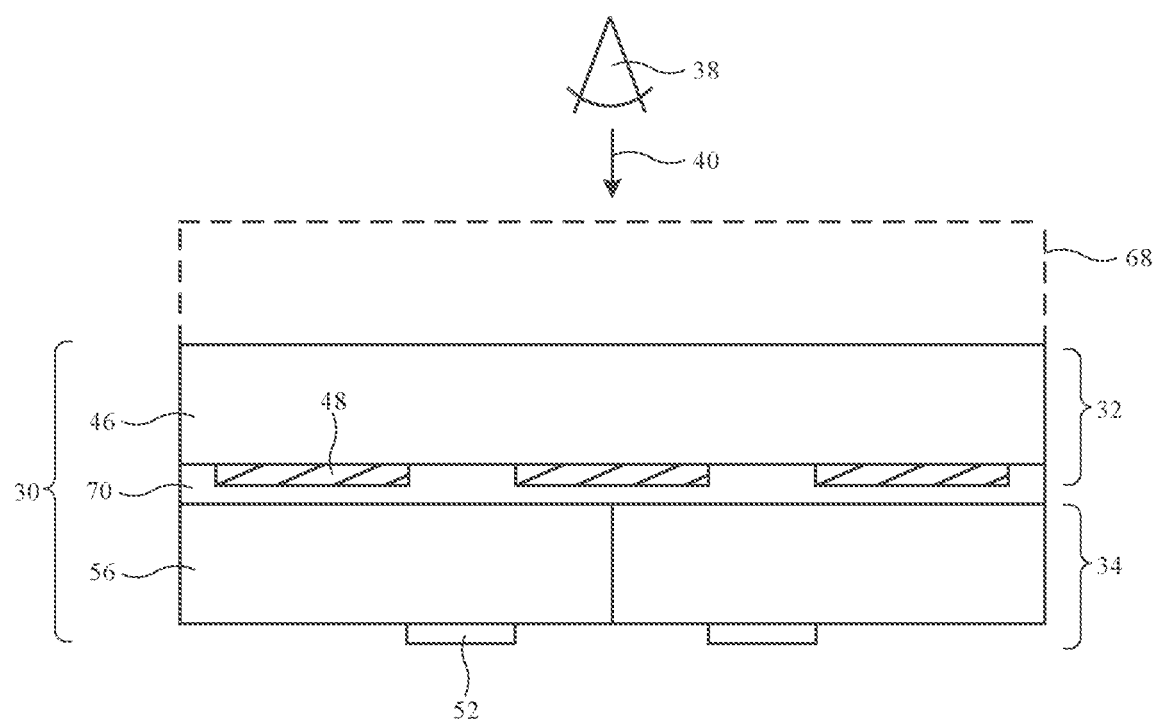
FIG. 24 is a cross-sectional side view of laminated masking layer and patterned layer structures in accordance with an embodiment.

As shown in FIG. 24, a layer of adhesive (e.g., clear polymer) may be used to attach mask 32 to patterned layer 34. In the illustrative configuration of FIG. 24, mask 32 includes transparent substrate 46. Masking elements may be formed in a desired pattern using a patterned thin-film layer or other patterned structures (e.g., patterned layer 48). Layer 34 may include a transparent substrate such as substrate 56 on which visual elements are formed. The visual elements may be formed, for example, using a patterned thin-film layer or other patterned structures (e.g., patterned layer 52). Layer 52 may, if desired, be formed on the outwardly facing surface of substrate 56 and the mask elements formed from patterned layer 48 may be formed on the outwardly facing surface of substrate 46.

The relative position of mask 32 and patterned layer 34 may be established in a factory or at other suitable times (e.g., using positioners 36 of FIG. 3). Adhesive 70 may be cured (e.g., by application of ultraviolet light, heat, curing agents, etc.) to attach mask 32 to layer 34 and thereby fix the positions of mask 32 and layer 34 with respect to each other. The adjustable-appearance layer formed by attaching substrates 46 and 56 together (or substrate 46 or substrate 56 alone) may be sufficiently strong to allow structures 30 to serve as a housing wall for device 10. For example, structures 30 of FIG. 24 may form some or all of a rear housing wall or other portion of housing 12. If desired, structures 30 of FIG. 24 and/or structure 30 of the other FIGS. may be provided with one or more additional structural layers such as optional transparent housing layer 68, which may form some or all of a housing wall or other structure for housing 12 on rear face R, sidewalls W, and/or front face F and which may be attached to structures 30 using adhesive or other attachment mechanisms.

Figure 25:
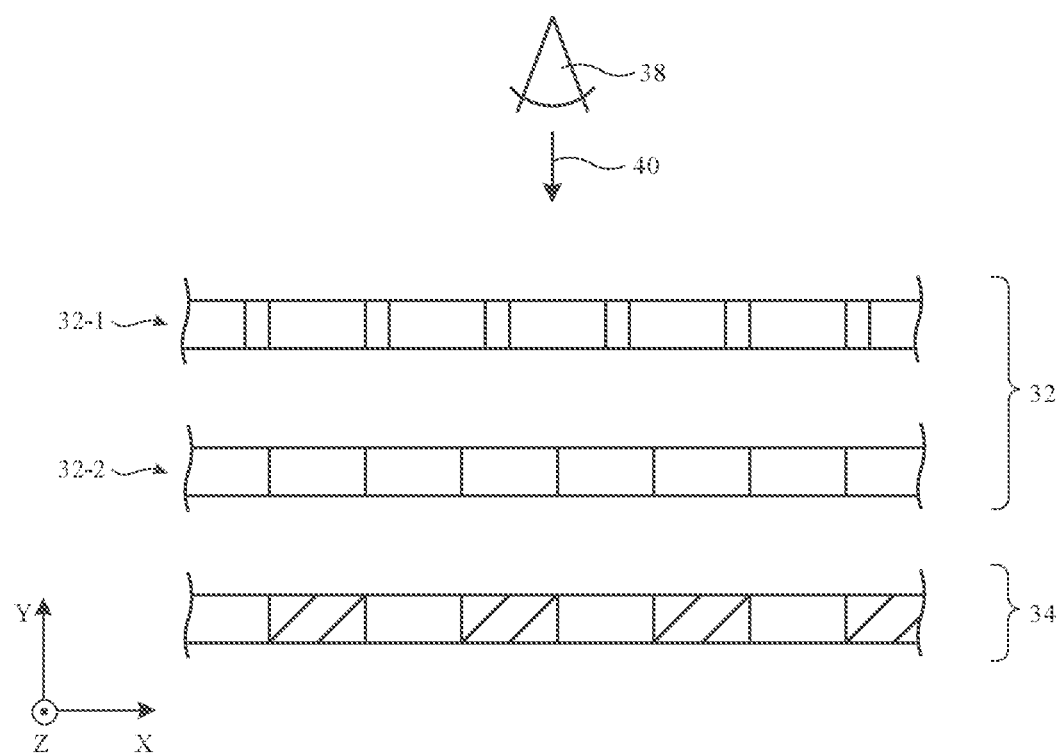
FIG. 25 is a cross-sectional side view of an illustrative multilayer mask and associated patterned layer in accordance with an embodiment.

If desired, mask 32 may include multiple masking layers such as illustrative first mask 32-1 and second mask 32-2 of mask 32 of FIG. 25. The positions of masks 32-1, 32-2, and patterned layer 34 may be adjusted relative to each other using positioners 36 and fixed in place (e.g., using adhesive, fasteners, welds, engagement structures, etc.). The thickness of these layers and the vertical spacing of the patterned elements in these layers may be selected to make the appearance of structures 30 angularly dependent or to make the appearance of structures 30 invariant to viewing angle. The mask layer in a single mask configuration or each of the mask layers in a multi-mask configuration may have masking elements with a constant pitch, a varying pitch (e.g., a gradient of element size, center-to-center spacing, optical and/or physical properties, etc.), as described in connection with the lateral variations of property PR of FIG. 5. The inclusion of multiple mask layers in mask 32 may therefore create an appearance for structures 30 that varies as a function of lateral distance X, Y across structures 30 and/or may create a uniform appearance across structures 30.

Figure 26:
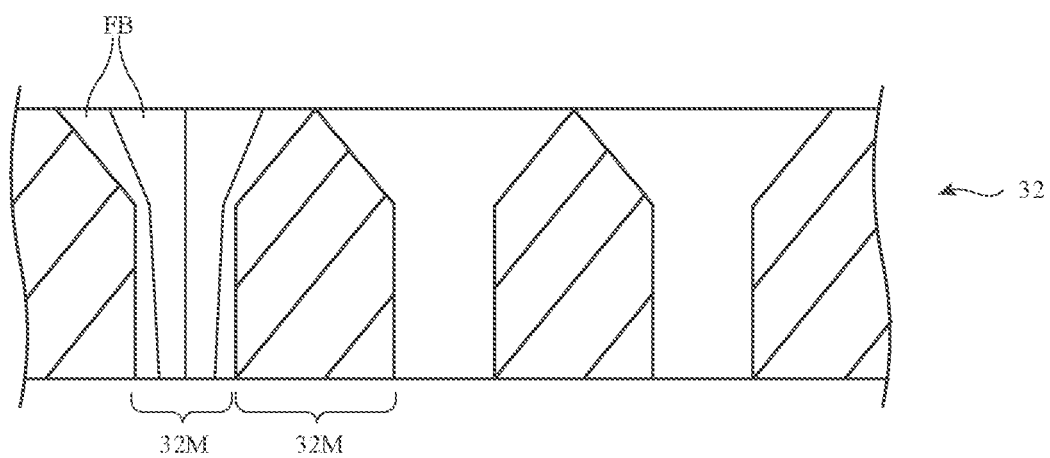
FIG. 26 is a cross-sectional side view of an illustrative mask in accordance with an embodiment.

The cross-sectional side view of illustrative mask 32 of FIG. 26 shows how masking elements 32M of mask 32 may include clear elements alternating with opaque elements. The clear elements may have bundles of fibers FB, and/or other structures (e.g., structures imparting haze, color, and/or other optical characteristics to the mask elements). Fibers FB may be flared outwardly as shown in FIG. 26 to provide a desired appearance for the outer surface of mask 32 and/or may have other cross-sectional profiles.

Figure 27:
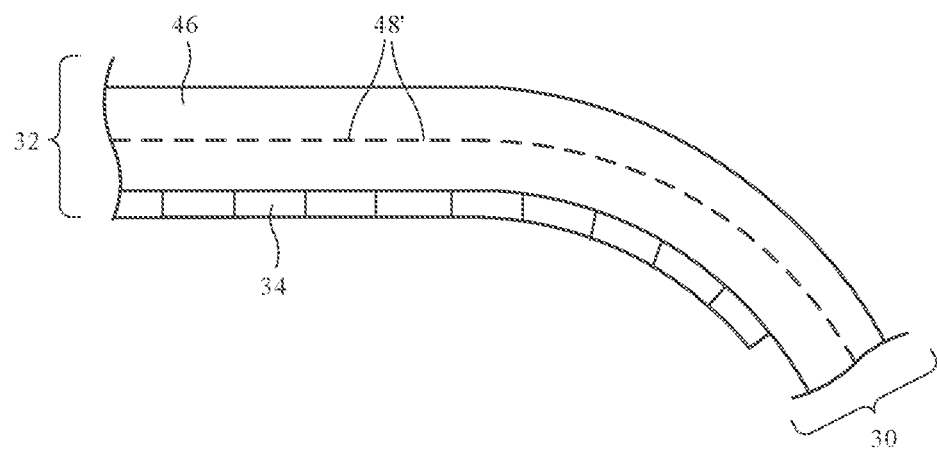
FIG. 27 is a cross-sectional side view of an illustrative mask and patterned layer in accordance with an embodiment.

FIG. 27 shows how structures 30 may have a curved cross-sectional profile (e.g., along an edge portion of housing 12, etc.). In the example of FIG. 27, substrate 46 includes embedded masking elements 32M formed from patterned layer 48'. Patterned layer 34 may be formed from patterned thin-film traces on a flexible substrate (e.g. layer 34 may be formed from a polymer film) and/or layer 34 may have other structures that allow patterned layer 34 to bend and conform to the curved inner surface of substrate 46. If desired, layer 34 may be moved relative to mask 32 by sliding layer 34 along the inner surface of mask 32.

Figure 28:
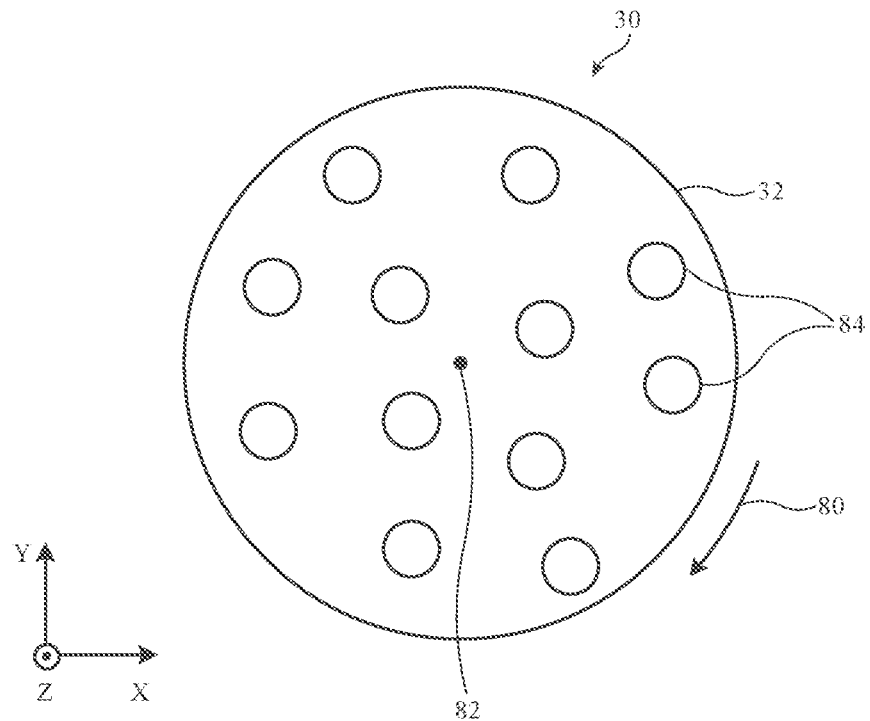
FIG. 28 is a top view of an illustrative circular mask in accordance with an embodiment.

FIG. 28 is a top view of mask 32 in an illustrative configuration in which mask 32 has a circular outline (e.g., structures 30 and optionally device 10 may have a circular footprint when viewed along the Z axis of FIG. 28). As shown in FIG. 28, mask 32 may be rotated in direction 80 about axis 82 when it is desired to move mask openings 84 or other mask features relative to underlying patterned layer 34 and thereby adjust the appearance of structures 30.

Figure 29:
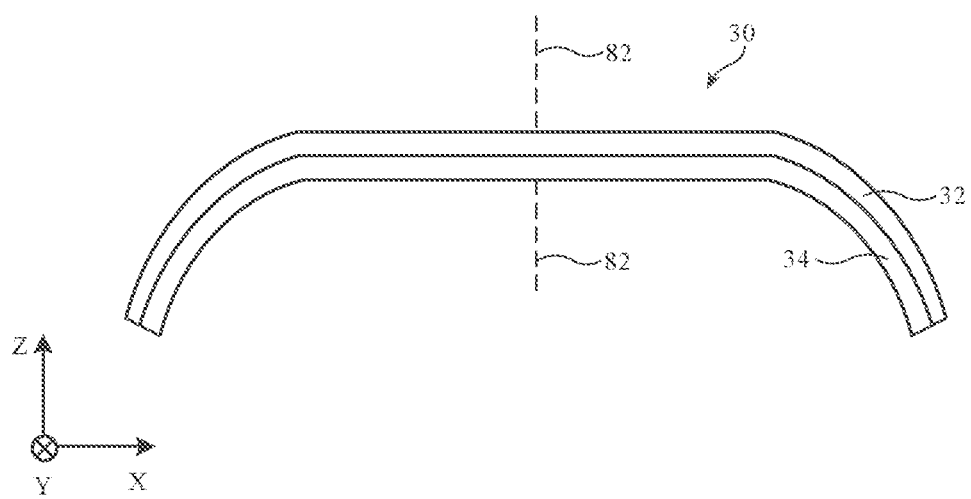
FIG. 29 is a cross-sectional side view of an illustrative circular mask overlapping a circular patterned layer in accordance with an embodiment.

FIG. 29 is a cross-sectional side view of structures 30 of FIG. 28 showing how mask 32 and patterned layer 34 may each have a curved cross-sectional profile while still accommodating rotational movement of mask 32 relative to patterned layer 34 about axis 80 to adjust structures 30.

In addition to or instead of providing structures in mask 32 that form masking elements of various shapes, sizes, and optical properties such as color, haze, light transmission, reflection, and light absorption, the optical properties of the elements of mask 32 may be varied by providing these elements with gratings, polarizing material, wave plates, lenses, prisms, and/or other optical elements that alter the behavior of incident, reflected, and/or transmitted light via refraction, diffraction, polarization, polarization rotation, etc.

Figure 30:
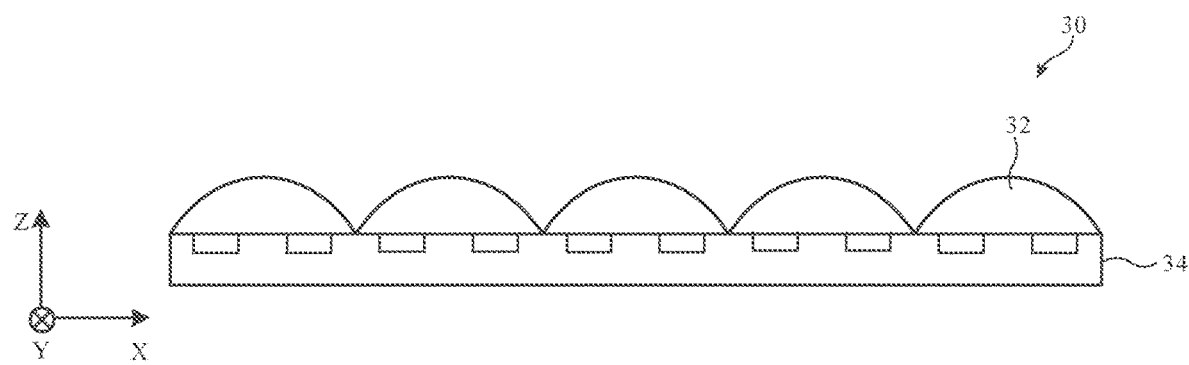
FIGS. 30 and 31 are cross-sectional side views of illustrative mask arrangements with optical elements in accordance with embodiments.
Figure 31:

Consider, as an example, adjustable-appearance structures 30 of FIG. 30. As shown in this illustrative configuration, mask 32 may have an array of mask elements formed from lens elements. The lens elements may be arranged in a two-dimensional array (rows and columns in the X-Y plane) of hemispherical (dome-shaped) lenses or a one-dimensional array of lenticular lenses (half-cylinder lens elements that each extend into the page of FIG. 30). With the presence of a lenticular lens array or other optical elements in mask 32 that refract light (or that alter the path of light using diffraction, etc.), different sets of the visual elements of patterned layer 34 will be visible as structures 30 are viewed from different angles, thereby making the appearance of structures 30 change depending on the user's angle of view of structures 30. As shown by illustrative mask 32 of FIG. 31 (which may include a two-dimensional array of pyramidal lens elements or a one-dimensional array of elongated (into the page) strip-shaped prisms), this viewing angle dependence effect may be achieved using prism-like optical elements. Other shapes of refractive elements for mask 32 (e.g. other clear light-refracting elements) and/or diffractive structures. etc. may be used, if desired.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device, comprising:
a housing;
a display coupled to the housing; and
an adjustable-appearance structure viewable through an area of the housing, wherein the adjustable-appearance structure comprises:
a mask with an array of mask elements; and
a patterned layer viewable through the mask.

2. The electronic device defined in claim 1 wherein the patterned layer comprises an array of visual elements.

3. The electronic device defined in claim 2 wherein the array of visual elements comprises visual elements of different colors.

4. The electronic device defined in claim 2 wherein the array of visual elements comprises visual elements with different optical properties.

5. The electronic device defined in claim 2 wherein the mask elements comprise an array of openings through which the visual elements are viewable.

6. The electronic device defined in claim 5 wherein the visual elements comprise a first set of visual elements with a first appearance and a second set of visual elements with a second appearance that is different than the first appearance and wherein the array of openings is aligned with a) the first set of visual elements, b) the second set of visual elements, or c) part of the first set of visual elements and part of the second set of visual elements.

7. The electronic device defined in claim 1 wherein the mask elements comprise light-refracting optical elements.

8. The electronic device defined in claim wherein the light-refracting optical elements comprise optical elements selected from the group consisting of: lenticular lenses, dome-shaped lenses, pyramidal lens, and prisms.

9. The electronic device defined in claim 1 wherein the mask comprises a first masking layer that has a first layer of patterned mask elements and a second masking layer that is separate from the first masking layer and that has second layer of patterned mask elements.

10. The electronic device defined in claim 1 wherein the mask and the patterned layer are configured to form a visible logo for the adjustable-appearance structure.

11. The electronic device defined in claim 1 wherein the adjustable-appearance layer is configured to exhibit a change in appearance upon movement of the mask relative to the patterned layer and wherein the mask and the patterned layer are fixed in position relative to each other in the housing.

12. The electronic device defined in claim 1 further comprising at least one positioner configured to move the mask relative to the patterned layer, wherein the adjustable appearance layer is configured to exhibit a change in appearance upon movement of the mask relative to the patterned layer.

13. The electronic device defined in claim 1 wherein the patterned layer has an array of visual elements with different appearances and wherein the mask comprises an array of openings through which a selected subset of the visual elements is viewable.

14. An electronic device, comprising:
electrical components;
a transparent layer;
a mask with an array of mask openings; and
an array of visual elements that includes first visual elements of a first appearance and second visual elements of a second appearance, wherein at least some of the first visual elements are viewable through the transparent layer and through the mask openings.

15. The electronic device defined in claim 14 wherein the transparent layer forms part of a housing that encloses the electrical components, the electronic device further comprising a display coupled to the housing.

16. The electronic device defined in claim 15 wherein the mask comprises an opaque layer on the transparent layer and wherein the array of mask openings comprises openings in the opaque layer.

17. The electronic device defined in claim 16 wherein the array of visual elements comprises an array of colored elements on a substrate layer.

18. An electronic device having opposing front and rear faces, comprising:
electronic components;
a housing in which the electronic components are mounted;
a display coupled to the housing on the front face;
a mask under a transparent portion of the housing on the rear face, wherein the mask has an array of mask elements; and
an array of colored elements visible through the mask elements.

19. The electronic device defined in claim 18 wherein the array of mask elements includes transparent elements and wherein the transparent elements have lateral dimensions configured to make the transparent elements indistinguishable to an unaided eye.

20. An electronic device, comprising:
a housing;
a display coupled to the housing; and
an adjustable-appearance structure viewable through an area of the housing, wherein the adjustable-appearance structure comprises:
a mask; and
a patterned layer viewable through the mask, wherein the adjustable-appearance layer is configured to exhibit a change in appearance upon movement of the mask relative to the patterned layer and wherein the mask and the patterned layer are fixed in position relative to each other in the housing.

* * * * *

UNITED STATES PATENT AND TRADEMARK OFFICE
CERTIFICATE OF CORRECTION

PATENT NO. : 11,175,700 B1
APPLICATION NO. : 16/874568
DATED : November 16, 2021
INVENTOR(S) : Joseph C. Poole et al.

It is certified that error appears in the above-identified patent and that said Letters Patent is hereby corrected as shown below:

In the Claims

Column 17, Line 10, in Claim 11, "adjustable-appearance layer" should read -- adjustable-appearance structure --

Column 17, Line 17-18, in Claim 12, "adjustable-appearance layer" should read -- adjustable-appearance structure --

Column 18, Line 33, in Claim 20, "adjustable-appearance layer" should read -- adjustable-appearance structure --

Signed and Sealed this
Third Day of May, 2022

Katherine Kelly Vidal
*Director of the United States Patent and Trademark Office*